(12) United States Patent
Otenko et al.

(10) Patent No.: US 8,930,584 B2
(45) Date of Patent: Jan. 6, 2015

(54) SYSTEM AND METHOD FOR PROVIDING A LINEARIZABLE REQUEST MANAGER

(75) Inventors: Oleksandr Otenko, Winnersh (GB); Prashant Agarwal, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 317 days.

(21) Appl. No.: 13/570,434

(22) Filed: Aug. 9, 2012

(65) Prior Publication Data

US 2014/0047140 A1 Feb. 13, 2014

(51) Int. Cl.
*G06F 13/14* (2006.01)
*G06F 9/52* (2006.01)

(52) U.S. Cl.
USPC .................... 710/5; 710/6; 718/102; 718/103

(58) Field of Classification Search
CPC ......... G06F 5/065; G06F 5/10; G06F 9/4881; G06F 9/52; G06F 9/526; G06F 13/1642
See application file for complete search history.

(56) References Cited

U.S. PATENT DOCUMENTS 8,504,691 B1 *   8/2013  Tobler et al. ................. 709/226
2004/0215848 A1 10/2004  Craddock et al.
2005/0120160 A1  6/2005  Plouffe et al.
2006/0271717 A1 * 11/2006 Koduri et al. ................. 710/241
2008/0189432 A1  8/2008  Abali et al.
2010/0169494 A1  7/2010  Machulsky et al.
2011/0252428 A1 * 10/2011 Maruyama ..................... 718/103
2012/0036509 A1 *  2/2012 Srinivasan et al. ............ 718/102
2012/0042034 A1  2/2012  Goggin et al.
2012/0303935 A1 * 11/2012 Tran et al. ..................... 712/208

OTHER PUBLICATIONS

Clark, et al., "Live Migration of Virtual Machines", NSDI '05: 2$^{nd}$ Proceedings of the Symposium on Networked Systems Design & Implementation, Jan. 1, 2005, pp. 273-286, UNSENIX Association, Berkeley, CA, United States.

* cited by examiner

*Primary Examiner* — Ilwoo Park
(74) *Attorney, Agent, or Firm* — Meyer IP Law Group

(57) ABSTRACT

Described herein are systems and methods for improving concurrency of a request manager for use in an application server or other environment. A request manager receives a request, and upon receiving the request the request manager associates a token with the request. A reference to the request is enqueued in each of a plurality of queues, wherein each queue stores a local copy of the token. A first reference to the request is dequeued from a particular queue, wherein when the first reference to the request is dequeued, the token is modified to create a modified token. Thereafter the request is processed. When other references to the request are dequeued from other queues, the other references to the request are discarded.

20 Claims, 10 Drawing Sheets

SYSTEM AND METHOD FOR PROVIDING A LINEARIZABLE REQUEST MANAGER

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the present invention are generally related to computer systems and software such as middleware, and are particularly related to systems and methods for improving concurrency of a request manager for use in a middleware machine or other environment.

BACKGROUND

In an environment that includes application servers, request processing has typically been completed in a serialized manner, where requests are received at a request receiving component, and placed in a particular queue based on system constraints. The request processing component would typically determine the priority of a request, enqueue the request, manage a pool of threads that execute the request, and maintain a request load as defined by the constraints. However, the functionality of the request processing component is protected by a synchronization lock, making the state transitions of the request processing component serializable. Serialization is a blocking property, and under high contention is a performance bottleneck. These are the areas that embodiments of the invention are intended to address.

SUMMARY

Described herein are systems and methods for improving concurrency of a request manager for use in an application server or other environment. A request manager receives a request, and upon receiving the request, the request manager associates a token with the request. A reference to the request is enqueued in each of a plurality of queues, wherein each queue stores a local copy of the token. A first reference to the request is dequeued from a particular queue, wherein when the first reference to the request is dequeued, the token is modified to create a modified token. Thereafter the request is processed. When other references to the request are dequeued from other queues, the other references to the request are discarded. Additionally, in accordance with an embodiment of the invention, a traditional queue can be extended to permit the passing of a function (e.g., a flattening function) to perform a number of operations on a queue that shares requests concurrently with other queues. In accordance with an embodiment, the queue and request sharing allows for a variety of request execution scheduling strategies, and enables queues to execute such strategies concurrently at the point of removing the request from the queue, thereby improving concurrency of the request manager code.

DETAILED DESCRIPTION

Figure 1:
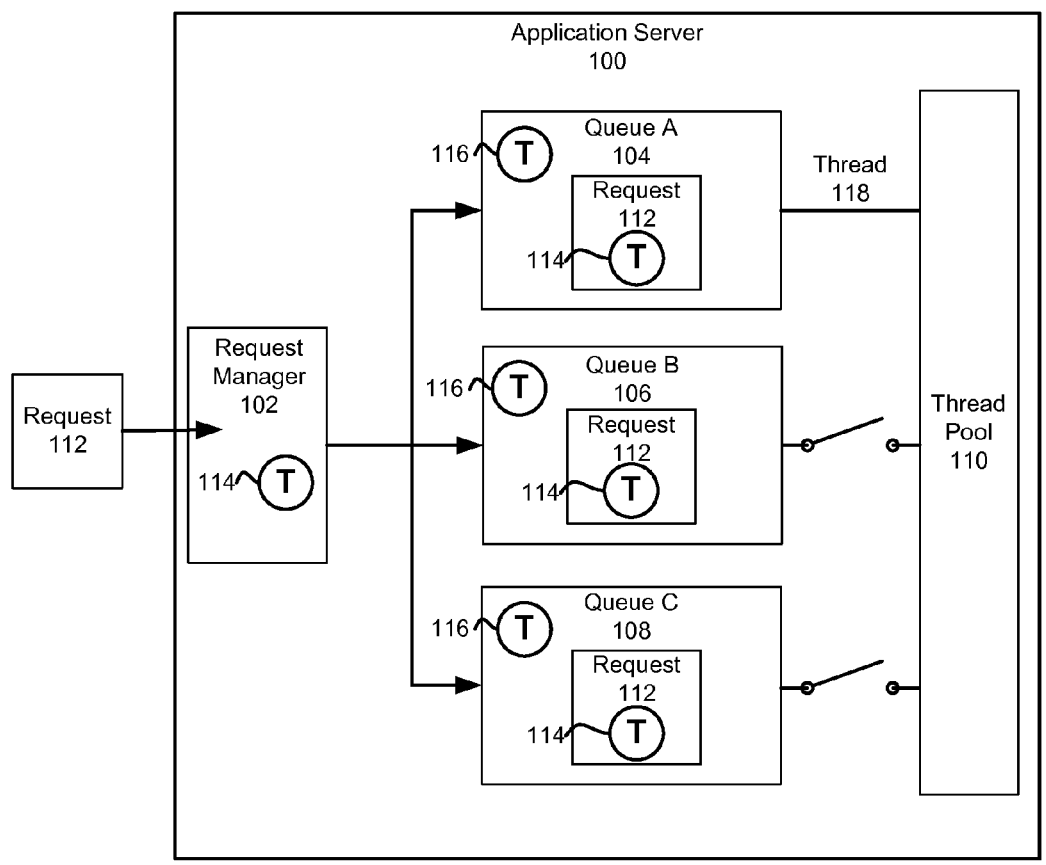
FIG. 1 shows an exemplary system for improving concurrency of a request manager for use in an application server, in accordance with an embodiment of the invention.

In the following description, the invention will be illustrated by way of example and not by way of limitation in the figures of the accompanying drawings. References to various embodiments in this disclosure are not necessarily to the same embodiment, and such references mean at least one. While specific implementations are discussed, it is understood that this is provided for illustrative purposes only. A person skilled in the relevant art will recognize that other components and configurations may be used without departing from the scope and spirit of the invention.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention.

As described above, a request processing component (e.g., a request management component or a request manager) manages the processing of requests, which requires prioritization logic that guides request execution, and policy constraints that guide acceptable resource utilization for a particular type of request. The request manager makes these decisions, and routes the requests to a particular queue so that the constraints for these requests are met in an optimal way (e.g., to improve throughput, average wait time, response time).

Typically, the request manager is in a synchronized block, and at the start of a critical or mutually exclusive operation, the request manager is locked, an operation that can not be executed concurrently (needs to be executed by one thread at a time) is executed, and when that operation has finished, the lock is released. Thus, because of the lock on the request manager, only one thread can access the request manager at a time. Thereafter, another thread can access the request manager to use the same execution logic.

For example, a thread that does socket reading, deserializes a message from a network socket and forms a request. The request, having a particular request type, is associated with one or more constraints that are maintained by the request manager. Example constraints include a maximum thread constraint and a minimum thread constraint, but are not limited thereto.

The maximum thread constraint defines a maximum constraint threshold, where threads over the maximum constraint threshold are not permitted to execute requests of a particular type. Otherwise, other requests may not be executed because all available threads may be executing requests of the particular type. This can result in a misbalance in resource utilization, or a denial of service for some types of requests. The minimum thread constraint defines a minimum constraint threshold that specifies a minimum number of requests of a particular type that should be in-flight should they arrive. In this way, the system may create new threads if there are no available threads. Otherwise, threads in-flight may not be able to execute if the in-flight threads are waiting for a particular request to be processed, and that particular request is waiting (e.g., deadlocked) in the queue since no threads are available to process the request. Thus, creating the new thread for the particular thread will resolve the deadlock.

The socket reading thread uses the request manager to schedule the request. In order to schedule the request, the socket reading component acquires a lock on the request manager (but may need to wait if another thread has already acquired a lock on the request manager), checks the constraints associated with the request, and based on the constraints, the thread schedules the request in a priority queue. The thread exits the critical section, and the lock on the request manager is released. Thereafter, an idle worker thread acquires a lock on the request manager (or waits if the request manager is locked), and once the worker thread acquires a lock, the thread checks the constraints of the request, and executes the request according to the constraints. If there are no outstanding requests to execute, the thread retires, releases the lock on the request manager, and returns to a thread pool.

A lock on the request manager creates a performance bottleneck since threads have to wait to execute requests. However, in accordance with an embodiment of the invention, the request manager operates without a lock, and thus, multiple threads can proceed concurrently providing for a linearizable request manager.

1. Request Sharing Across Multiple Queues

FIG. 1 shows an exemplary system for improving concurrency of a request manager for use in an application server, in accordance with an embodiment of the invention. As shown in FIG. 1, an application server 100 includes a request manager 102, multiple queues (104, 106 and 108) and a thread pool 110 having threads that execute requests placed in the queues. The queues can be, for example, a priority queue, a maximum constraint queue, a minimum constraint queue or another queue type.

As shown in FIG. 1, a request 112 is received at the request manager 102. The request manager 102 associates the request 112 with a token 114, and based on the request, the request manager 102 enqueues the request 112 and the token 114 in one or more queues (104, 106 and 108). For each queue the request 112 is enqueued, a local copy of the token 116 is also stored in that queue. For example, as shown in FIG. 1, the queues (104, 106 and 108) include the request 112, the token 114, and a local copy of the token 116.

The thread pool 110 includes threads (e.g., worker threads) that process the requests at each queue. Since the same request can be enqueued in multiple queues, the problem that arises is ensuring that the request enqueued in multiple queues is executed only once. In accordance with an embodiment of the invention, to ensure that a request enqueued in multiple queues is executed only once, the request is processed in a coordinated fashion such that the queue processing the request communicates knowledge that the request has been processed.

Returning to FIG. 1, a thread 118 is assigned to queue A 104 to process the request 112. Prior to dequeuing the request 112 by the thread 118, queue A 104 compares the token 114 associated with the request to the local copy of the token 116 stored in that queue. If the token 114 associated with the request 112 matches the local copy of the token 116, then the request has not been claimed by another queue, and queue A 104 atomically modifies the token associated with the request to create a modified token. Since each queue references the same request 112, the request in each queue will now be associated with the modified token. Thereafter, the request 112 is processed by queue A 104.

Figure 2:
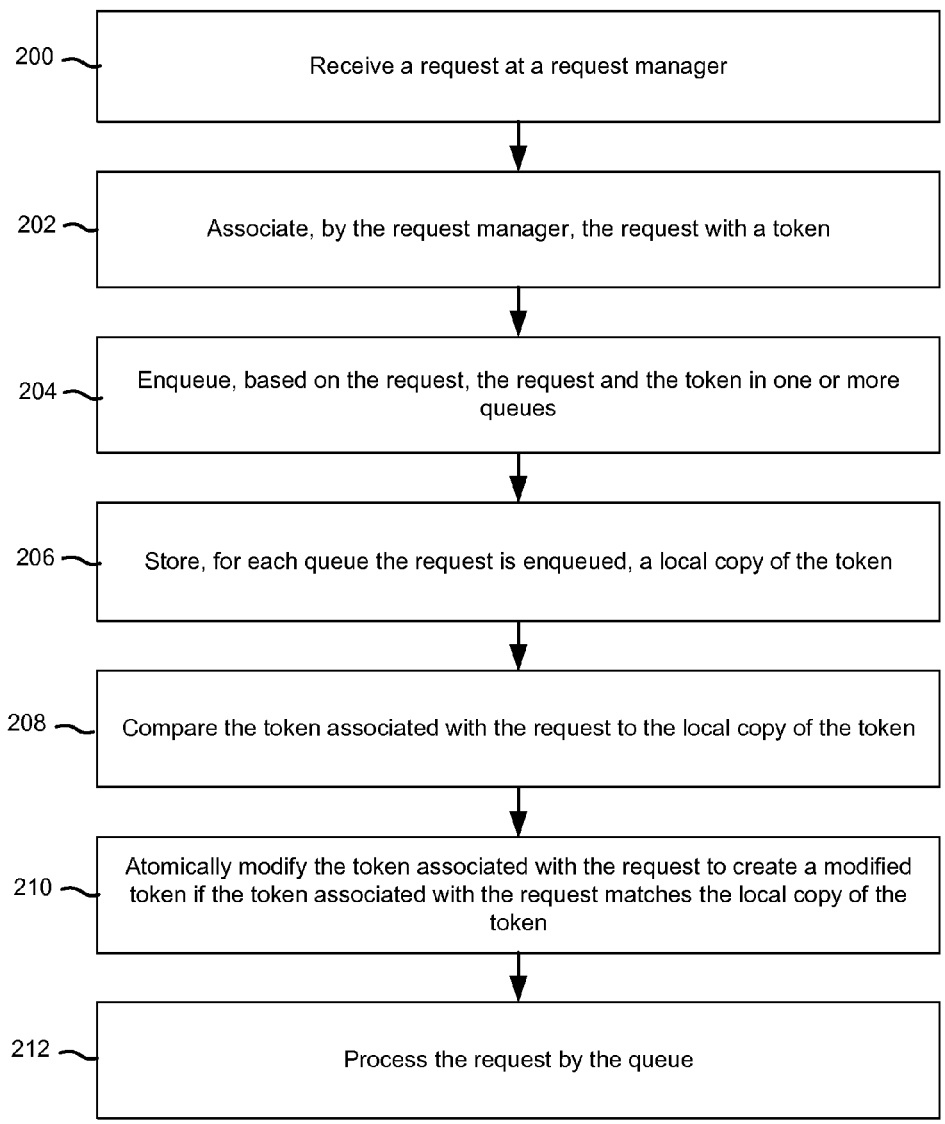
FIG. 2 shows a flowchart of a method in accordance with an embodiment of the invention, for enqueuing a request to improve concurrency of a request manager for use in an application server or other environment.

FIG. 2 shows a flowchart of a method in accordance with an embodiment of the invention, for enqueuing a request to improve concurrency of a request manager for use in an application server or other environment. At step 200, a request is received at a request manager. At step 202, the request manager associates the request with a token. At step 204, based on the request, the request manager enqueues the request and the token in one or more queues. At step 206, for each queue the request is enqueued, a local copy of the token obtained at step 202 is stored in that queue.

At step 208, prior to dequeuing the request by a thread, the queue the request is enqueued compares the token associated with the request to the local copy of the token. At step 210, if the token associated with the request matches the local copy of the token, then the request has not been claimed by any other queue, and the queue atomically modifies the token associated with the request to create a modified token. Since each queue references the same request, the request in each queue will be associated with the modified token. At step 212, the request is processed by the queue. When the other queues attempt to dequeue the request, the request is discarded because the token associated with the request does not match the local copy of the token stored in that queue since the token associated with each request has been atomically modified.

Figure 3:
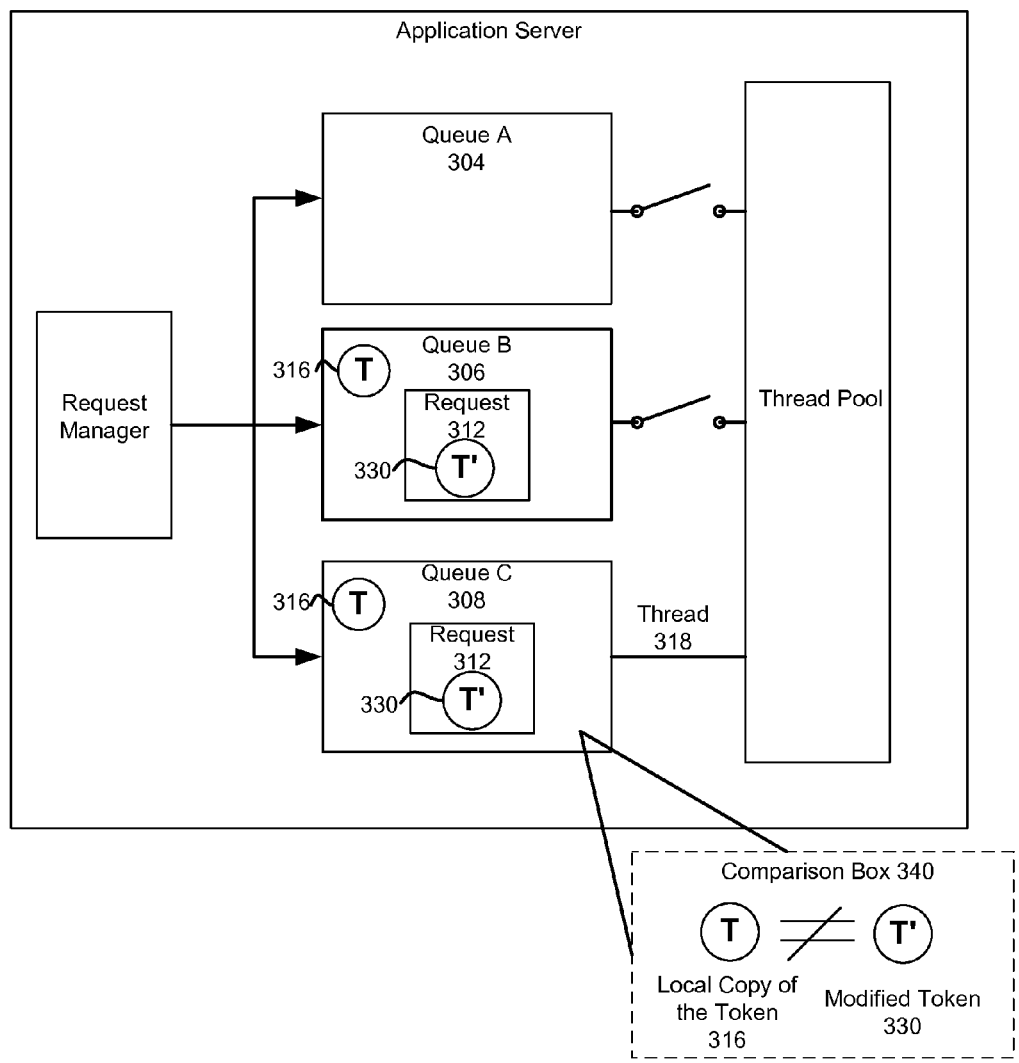
FIG. 3 shows an exemplary system for improving concurrency of a request manager for use in an application server, in accordance with an alternate embodiment of the invention.

For example, as shown in FIG. 3, queue A 304 has atomically modified the token associated with the request 312 to create a modified token 330. Since each queue references the same request 312, the request in each queue will now be associated with the modified token 330. Thereafter, when either queue B 306 or queue C 308 attempts to dequeue the request 312, the attempt will fail because the token associated with the request will not match the local copy of the token 330 stored in that queue. For example, when queue C 308 attempts to dequeue the request 312 to thread 318 for processing, queue C will compare the modified token 330 associated with the request to the local copy of the token 316 for that queue, as shown in the comparison box 340. The comparison will fail because the modified token 330 will not match the local copy of the token 316, and the request 312 will be discarded.

As described above an attempt to claim a request can fail when the token associated with the request does not match the local copy of the queues token. Alternatively, the attempt to claim a request can fail when an atomic update of the token fails. For example, a thread attempts to claim the token of the request which is T, by setting the token to T'. If the atomic operation succeeds, the thread knows it successfully claimed the request. If the atomic operation fails, the thread knows some other thread has claimed the request, and looks for the next request in this queue.

In accordance with an embodiment of the invention, normally an atomic update is performed using a conditional atomic operation, such as compare-and-set, whereby a value of variable X is set to B only if the current value A of variable X is the same as expected by a caller (e.g., a thread). For example, a caller reads the value of variable X, observes that it is A and determines that A satisfies the caller's internal logic. Thereafter, the caller attempts to update the value of X by invoking a compare-and-set operation and providing the reference to X, expected value A, and a new value B. Compare-and-set atomically fetches the value of X, which may have changed concurrently after the last time the caller observed the value, and sets the value of X to B if, and only if, the fetched value of X is A, as the caller expects. The success of the operation is returned to the caller, so the caller may judge how to proceed.

Figure 4:
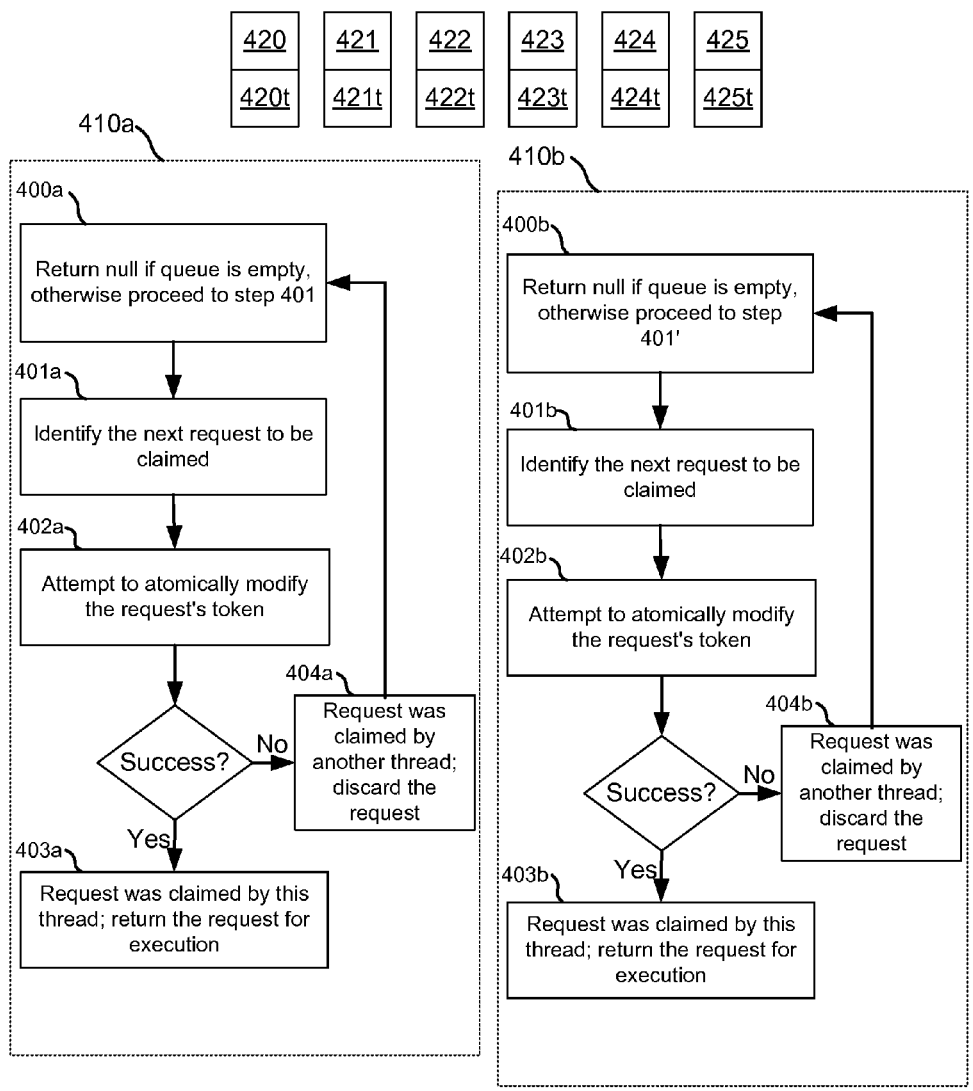
FIG. 4 shows a flowchart of a method in accordance with an embodiment of the invention, for dequeuing a request to improve concurrency of a request manager for use in an application server or other environment.

FIG. 4 shows a flowchart of a method in accordance with an embodiment of the invention, for dequeuing a request to improve concurrency of a request manager for use in an application server or other environment. FIG. 4 shows the operation of two threads 410a, 410b operating concurrently to dequeue requests. Threads 410a, 410b concurrently attempt to claim/dequeue a request from a plurality of requests 420, 421, 422, 423, 424, 425 associated with tokens 420t, 421t, 422t, 423t, 424t, 425t. The requests 420, 421, 422, 423, 424, 425 may either be in the same queue or in different queues that share the requests.

At step 400a, thread 410a, is called and returns null if the queue addressed is empty, otherwise thread 410a proceeds to step 401a and identifies the next request to be claimed. At step 402a, thread 410a attempts to atomically modify the token of the identified request. If the attempt to atomically modify the token of the identified request is successful, the request is claimed by thread 410a, and thread 410a proceeds to step 403a in which thread 410a returns the identified request for execution. If the attempt to atomically modify the token of the identified request is not successful, the request was claimed by another thread, and thus thread 410a proceeds to step 404a in which thread 410a discards the identified request and loops back to step 400a. Thereafter, thread 410a can attempt to process a different request in that queue, or, if the queue does not contain any more requests, process a different queue, or return null if the queue is empty.

Likewise, at step 400b, thread 410b, is called and returns null if the queue addressed is empty, otherwise thread 410b proceeds to step 401b and identifies the next request to be claimed. At step 402b, thread 410b attempts to atomically modify the token of the identified request. If the attempt to atomically modify the token of the identified request is successful, the request is claimed by thread 410b, and thread 410b proceeds to step 403b in which thread 410b returns the identified request for execution. If the attempt to atomically modify the token of the identified request is not successful, the request was claimed by another thread, and thus thread 410b proceeds to step 404b in which thread 410b discards the identified request and loops back to step 400b. Thereafter, thread 410b can attempt to process a different request in that queue, or, if the queue does not contain any more requests, process a different queue, or return null if the queue is empty.

As shown in FIG. 4, threads 410a, 410b operate concurrently in attempting to claim/dequeue a request from a plurality of requests 420, 421, 422, 423, 424, 425 associated with tokens 420t, 421t, 422t, 423t, 424t, 425t. The interleaving of threads 410a, 410b depends on the timing of the various steps and whether or not the threads attempt to claim the same or different requests. For example, if threads 410a and 410b are called at the same time and happen to identify the same one of requests 420, 421, 422, 423, 424, 425 in steps 401a and 401b, a so called race to claim the request will occur. That is, both of threads 410a and 410b will attempt to atomically modify the same token associated with the identified request. Whichever thread 410a or 410b performs step 402a, 402b first (the winner of the race) modifies the token associated with the identified request and proceeds on the success branch step 403a or 403b. The next thread 410a or 410b to attempt to perform step 402a, 402b (the loser of the race) recognizes the token has previously been modified, indicating that the attempt to claim the request has failed. Whichever thread loses the race therefore proceeds on the failure branch to step 404a or 404b. If each thread 410a, 410b identifies a different request in step 401a, 401b, there is no race and both threads 410a, 410b succeed to claim their different requests and proceed to steps 403a and 403b to return the request for execution. The queue and request sharing by multiple threads (e.g. threads 410a, 410b) enables queues to execute dequeuing strategies concurrently at the point of a thread removing the request from the queue, thereby improving concurrency of the request manager code.

It will be evident that the example code provided in Table 1 is provided for purposes of illustration, and that in accordance with other embodiments, other code can be implemented by a queue to process a request.

TABLE 1

```
class RequestManager {
    PriorityQueue normalRequests = ...
    ThreadPool idleThreads = ...
    ThreadPool standbyThreads = ...
    public void begin( Maybe<Request> r ) { // called to start request
processing
        if ( acquireMinConstraint( r ) ) {
            r.maxConstraint.getAndIncrement( );
            Thread t = idleThreads.poll( );
            if ( t == null ) t = standbyThreads.poll( );
            if ( t == null ) t = new Thread( );
            scheduleWith( t, r );
            return;
        }
        long maybeToken = r.getToken( );
        r.minConstraintQueue.put( r, maybeToken );
        normalRequests.put( r, maybeToken );
    }
    public Request end( Request r ) { // called by the thread that
finished processing to mark the end of the cycle
        Request next;
        if ( isMaxConstraintReached( r ) ) {
            next = r.maxConstraintQueue.poll(CLAIM_REQUEST);
            if ( next != null ) return next;
        }
        updateConstraints( r, -1 );
        while ( acquireMinConstraint( r ) ) {
            next = r.minConstraintQueue.poll(CLAIM_REQUEST);
            if ( next != null ) {
                next.maxConstraint.getAndIncrement( );
                return next;
            }
        }
        return
        normalRequests.take(CHECK_MAXIMUM_CONSTRAINT);
```

Referring to Table 1, by way of example, the begin method is called to start request processing, where the request, along with a token associated with the request, is enqueued in one or more queues by a request manager. A local copy of the token is also stored in each queue the request is enqueued. Since each queue references the same request and associated token, a modification to the token by any queue will be recognized by all queues, while the local copy of the token can only be modified by the queue where the local copy of the token resides.

The end method is called to end the request processing, where the thread polls any one of the queues to process the request. The queue where the request is being polled initiates a compare and set operation to determine whether the token value stored in the request matches the value of the local copy of the token. If the operation determines that the value of the token associated with the request and the value of the local copy of the token are the same, it modifies the value of the token associated with the request. By doing so the queue claims the request for processing by the thread. Thereafter, when a thread attempts to poll the request from a different queue, the compare and set operation initiated by that queue will fail because the value of the local copy of the token in that queue will be different from the value of the token associated with the request in that queue. When the failure to claim the request is indicated by the atomic compare and set operation, the thread will then attempt to process a different request in that queue, or poll a different queue for a request.

Figure 5:
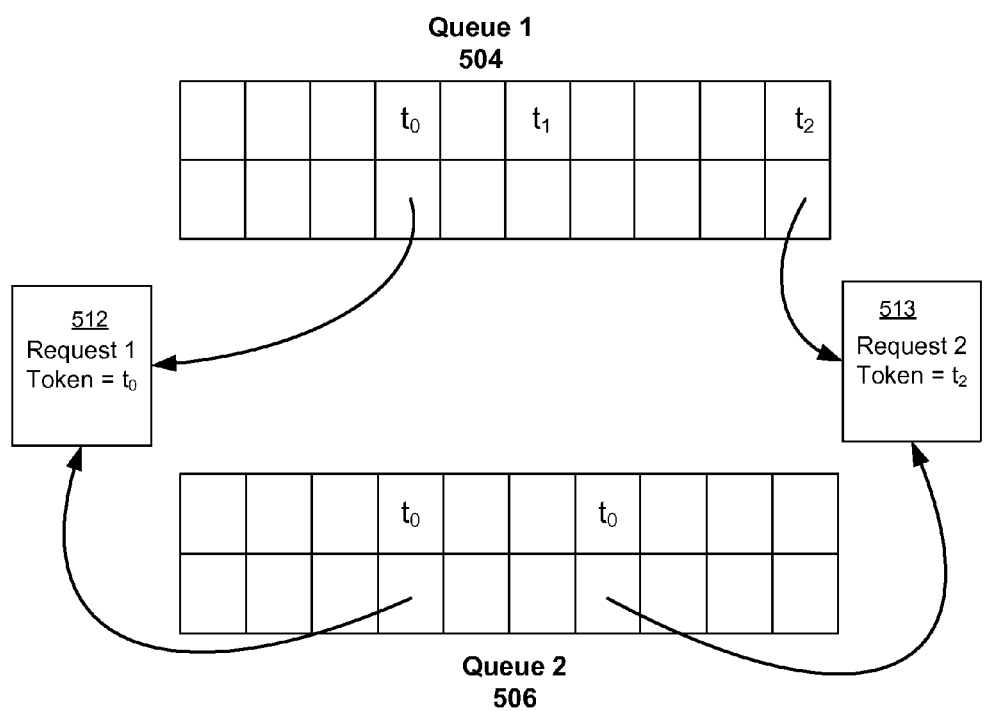
FIG. 5 shows an exemplary state of a pair of queues, in accordance with an embodiment of the invention.
Figure 6:
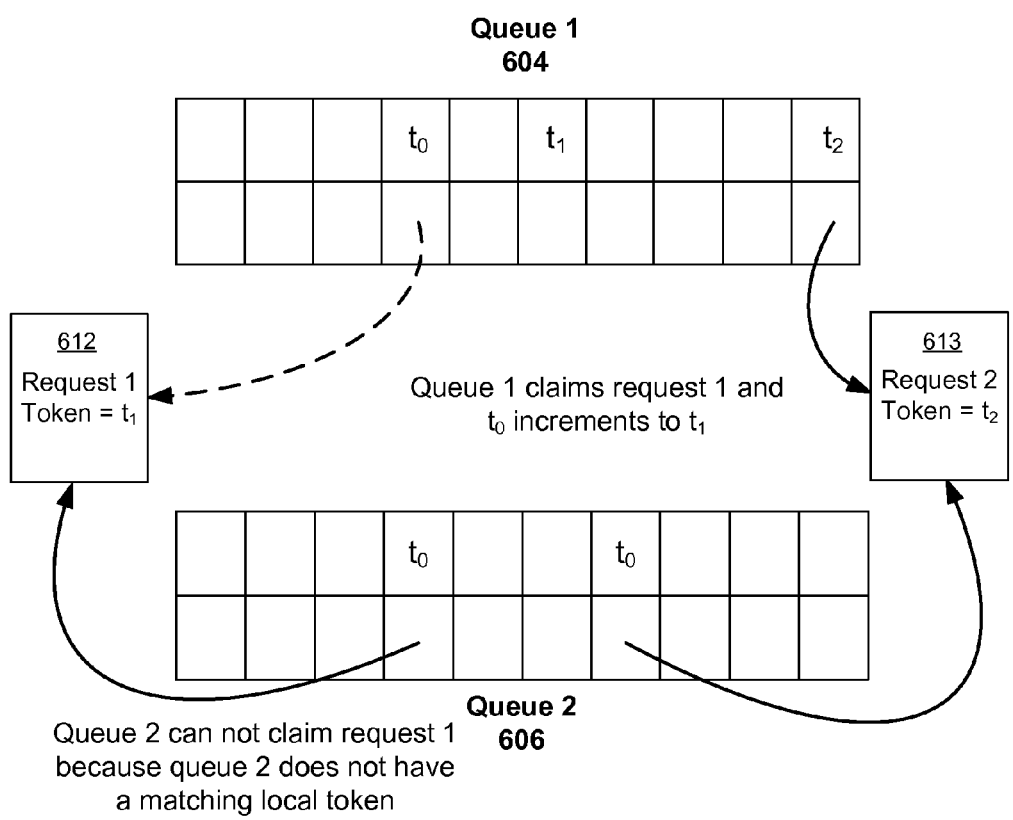
FIG. 6 shows an exemplary state of a pair of queues, in accordance with an embodiment of the invention.
Figure 7:
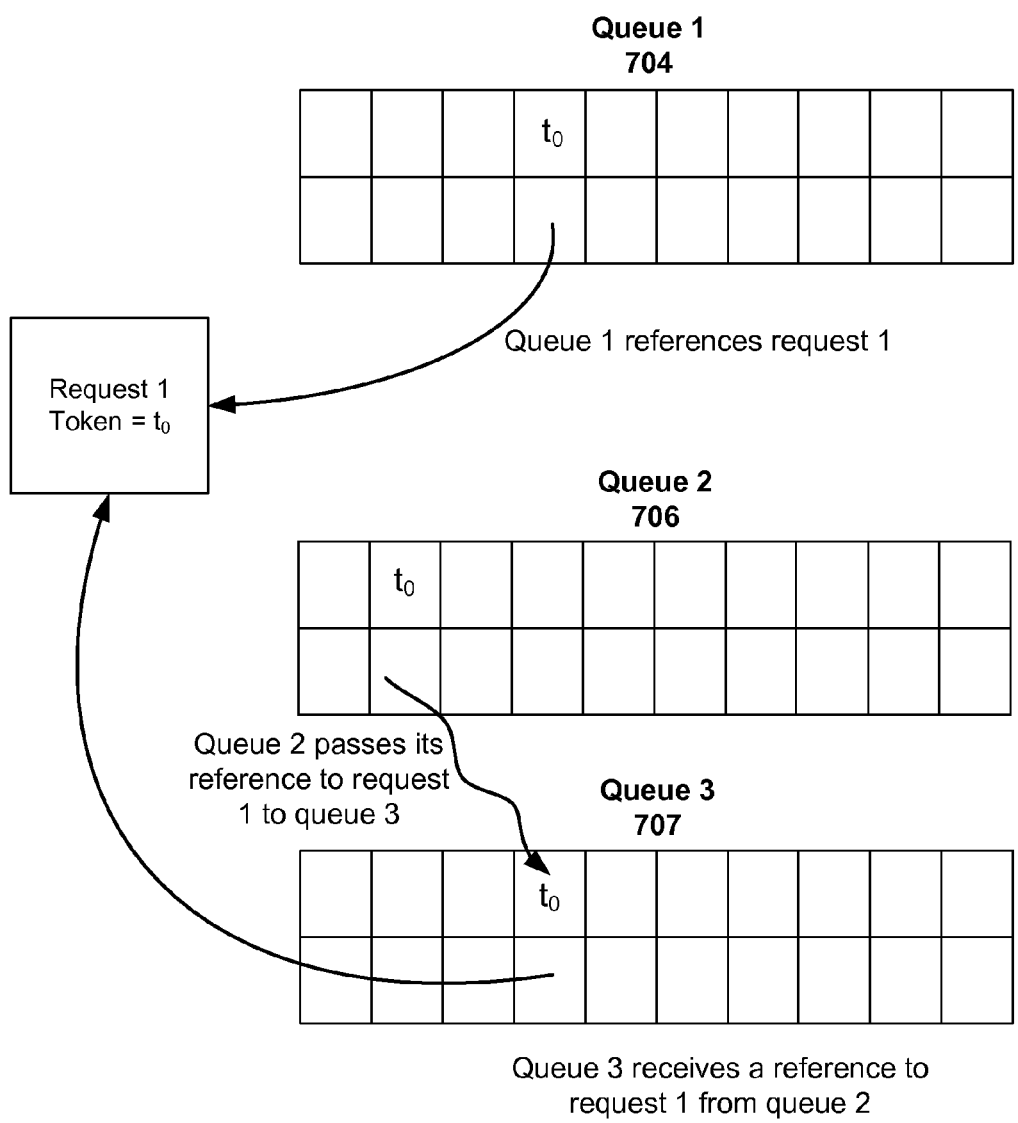
FIG. 7 shows an exemplary state of a set of queues, in accordance with an embodiment of the invention.

FIGS. 5-6 illustrate the process of claiming a request. FIG. 7 illustrates the process of delegating requests through the same mechanism as claiming the requests. For example, FIG. 5 illustrates an exemplary state of a pair of queues, in accordance with an embodiment of the invention. As shown in FIG. 5, a first queue 504 and a second queue 506 reference a first request 512 and a second request 513. The first request 512 includes a token value $t_0$, and the second request 513 includes a token value $t_2$.

Each queue includes cells for storing information. For example, the top row of cells for each queue can be used to store a local copy of a token, and the bottom row of cells can used to store a reference to a request object. The local copy of the token may contain stale values and have no corresponding reference to a request. As shown in FIG. 5, local copy of the token $t_1$ does not have a corresponding reference to a request, while local copy of the token $t_0$ is associated with the first request 512, and local copy of the token $t_2$ is associated with the second request 513. Thus, both queues reference two requests, but may store different local token values for those requests, depending on history of queue accesses.

The first request 512 can be claimed from either of the queues since both queues store a matching local copy of the token $t_0$. However, the second request 513 can be claimed only from the first queue 504 since only the first queue has the matching local copy of the token $t_2$. The second queue 506 stores a stale value of the local copy of the token $t_0$, because, for example, the same request object may have been claimed from the first queue 504 and reused several times before it will be observed in the second queue 506 with the local copy of the token $t_0$ (for example, the request is observed with a stale token when the second queue 506 is polled for requests, and eventually it attempts to claim Request 2 at 513).

Thus, in accordance with an embodiment of the invention, the request object can be recycled and reused, and the value of the token associated with the request object can be changed each time the request object is used. For example, a request is received at a request manager. The request manager stores the request and a token associated with the request in the request object, where the token value can be $t_2$. A reference to the request object is scheduled in one or more queues, and a local copy of the token $t_2$ is stored in those queues. When the request is processed from one of the queues, the reference to the request object, along with the local copy of the token, will still reside in the other queues. However, the request object can then be reused by the request manager to schedule a new request, and the new request can have a new value of a token associated with it (for example, the value of the token can be $t_3$). When a thread attempts to process the old request from the other queues, the attempt will fail, and the reference to the old request will be discarded from those queues at that time. Since the newly scheduled request has a new token value associated with it, the request can be claimed by any one of the queues the request resides in that has a matching local value of the token.

FIG. 6 illustrates an exemplary state of a pair of queues, in accordance with an embodiment of the invention, as it can be observed after the state depicted in FIG. 5. As shown in FIG. 6, the first queue 604 has claimed the first request 612. When the first queue 604 claims the first request 612, the first queue compares the token associated with the first request to the local copy of the token stored in the first queue. Since the token associated with the first request matched the local copy of the token, then the first request has not been claimed by any other queue, and the first queue atomically modifies the token associated with the first request to create a modified token.

For example, the value of the token associated with the first request 612 at the time the request was scheduled was $t_0$, and the value of the local copy of the token at this time was also $t_0$, as can be seen in FIG. 5, where the matching request is 512. The first queue 604 (queue 504 in FIG. 5) can successfully claim the first request 612 since the value of the token associated with the first request is the same as the value of the local copy of the token. While claiming the request, the first queue 604 atomically modifies the token associated with the first request to create a modified token. For example, the first queue 604 can increment the value of the token to create a modified token having a value of $t_1$. Thereafter, when the second queue 606 eventually attempts to dequeue the first request, the attempt will fail because the token value associated with the request ($t_1$) does not match the value ($t_0$) of the local copy of the token stored in the second queue.

FIG. 7 illustrates an exemplary state of a set of queues, in accordance with an embodiment of the invention. As shown in FIG. 7, a first queue 704 and a third queue 707 include a reference to a request 712, where the third queue receives a reference to the request from a second queue 706.

For example, the second queue 706 can be a priority queue and the third queue 707 can be a maximum constraint queue. The second queue 706 processes the request 712 using a check maximum constraint function, which adds the reference to the request and the local copy of the token to the third queue 707 since the maximum constraint function is satisfied. Thus, a reference to a request 712 and a local value of a token can be moved from one queue to another using a check maximum constraint function when there are too many requests of a given request type being processed. Thereafter, since the reference to the request is moved to the third queue unmodified, the request 712 having a token $t_0$ can be claimed from either the first or third queue because each queue includes a token value $t_0$. The second queue 706 cannot claim the request because the second queue no longer references the request, and the free cell in the second queue is then able to store a reference to a different request.

2. Concurrent Prefix of a Priority Queue

Figure 8:
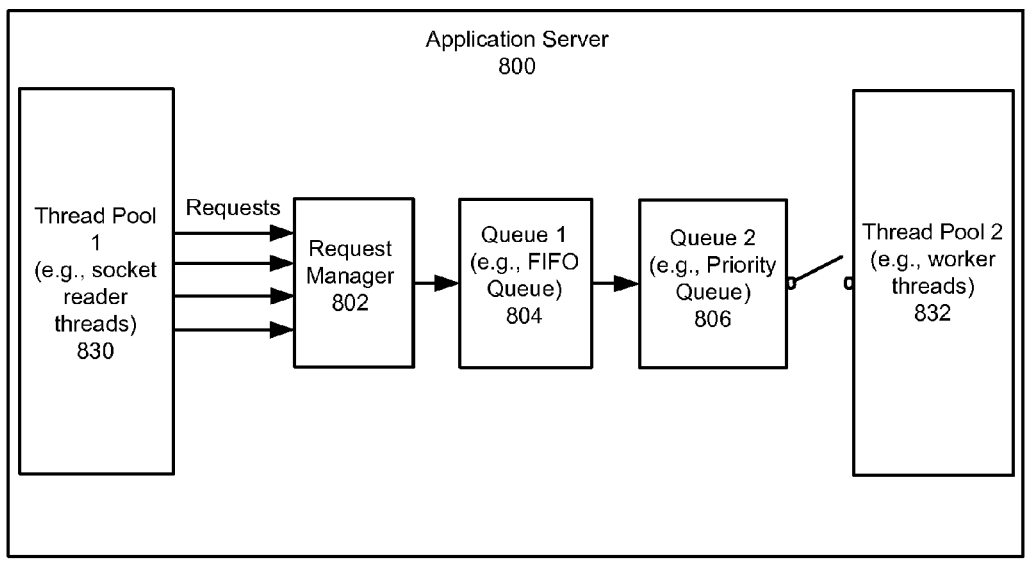
FIG. 8 shows an exemplary system for improving concurrency of a priority queue for use in an application server, in accordance with an embodiment of the invention.

FIG. 8 shows an exemplary system for improving concurrency of a priority queue for use in an application server, in accordance with an embodiment of the invention. As shown in FIG. 8, an application server 800 includes a request manager 802, a first and second thread pool (830, 832), and a first and second queue (804, 806). The first thread pool 830 can include one or more socket reader threads that perform socket reading. Socket reader threads read a request from a socket, and using the request manager enqueue the request. The second thread pool 832 can include one or more worker threads that perform the work required to satisfy the request read from the socket.

The first queue 804 can be a first in first out (FIFO) queue, but is not limited thereto. The second queue 806 can be a priority queue, or any queue that performs some type of work when accepting a request. A typical design will not have the FIFO queue 804, so the requests will be enqueued with the priority queue 806 directly. When a request is enqueued at the priority queue 806, a thread acquires a lock around the methods used by the priority queue, during which no other thread can access the queue to schedule a request or poll for a request. However, contention is created at the priority queue by the socket reading threads that want to enqueue a request for execution, since each socket reading thread will have to wait until the lock is released to enqueue a request.

Returning to FIG. 8, a dedicated thread empties the FIFO queue 804 by enqueuing requests into the priority queue 806 in the order received at the FIFO queue. In this way, the dedicated thread acts as a proxy to those threads that would otherwise be enqueuing requests into the priority queue 806 directly, and since only one thread is accessing the priority queue, the lock is contended to a smaller extent. Thus, by adding the FIFO queue 804 ahead of the priority queue 806, contention at the priority queue is reduced since only the dedicated thread adds requests to the priority queue while a number of idle threads remove requests from the priority queue. In a traditional system, there would be multiple threads adding requests to the priority queue 806, and as a result contention increases, throughput decreases, and efficiency decreases since threads go idle waiting for the lock to be released. In accordance with an embodiment of the invention, implementing the FIFO queue 804 ahead of a priority queue 806 increases throughput because requests can be schedule concurrently without the scheduling threads getting blocked.

For example, a socket reader thread from the first thread pool 830 retrieves a request from a socket and uses the request manager to enqueue the request in the FIFO queue 804. The FIFO queue 804 is emptied by a dedicated thread, and the requests are moved to the priority queue 806, and a worker thread from the second thread pool 832 accepts the request from the priority queue to perform the work required by the request. In a traditional system, the socket reader thread directly schedules requests in the priority queue and may have to wait before scheduling the request in the priority queue because, for example, a thread may have a lock on the priority queue. During the time the socket reading thread waits, there may be other outstanding requests that need to be read from the sockets, but the socket reading thread is waiting to schedule the request. In accordance with an embodiment of the invention, by placing the request ready to be executed in the FIFO queue, where concurrent access is much cheaper, the socket reader thread does not need to wait, and can perform reading of a socket to place another request in the queue, and thus improve throughput.

When moving the request, the dedicated thread copies the local copy of the token in a manner similar to that described above for FIG. 7. For example, as described above, the FIFO queue stores both the local copy of the token and the reference to the request, and the thread is able to copy both the local copy of the token and the reference without actually claiming the request. This ensures that the request can be claimed from the priority queue and any other queues that the request may have been enqueued with.

Figure 9:
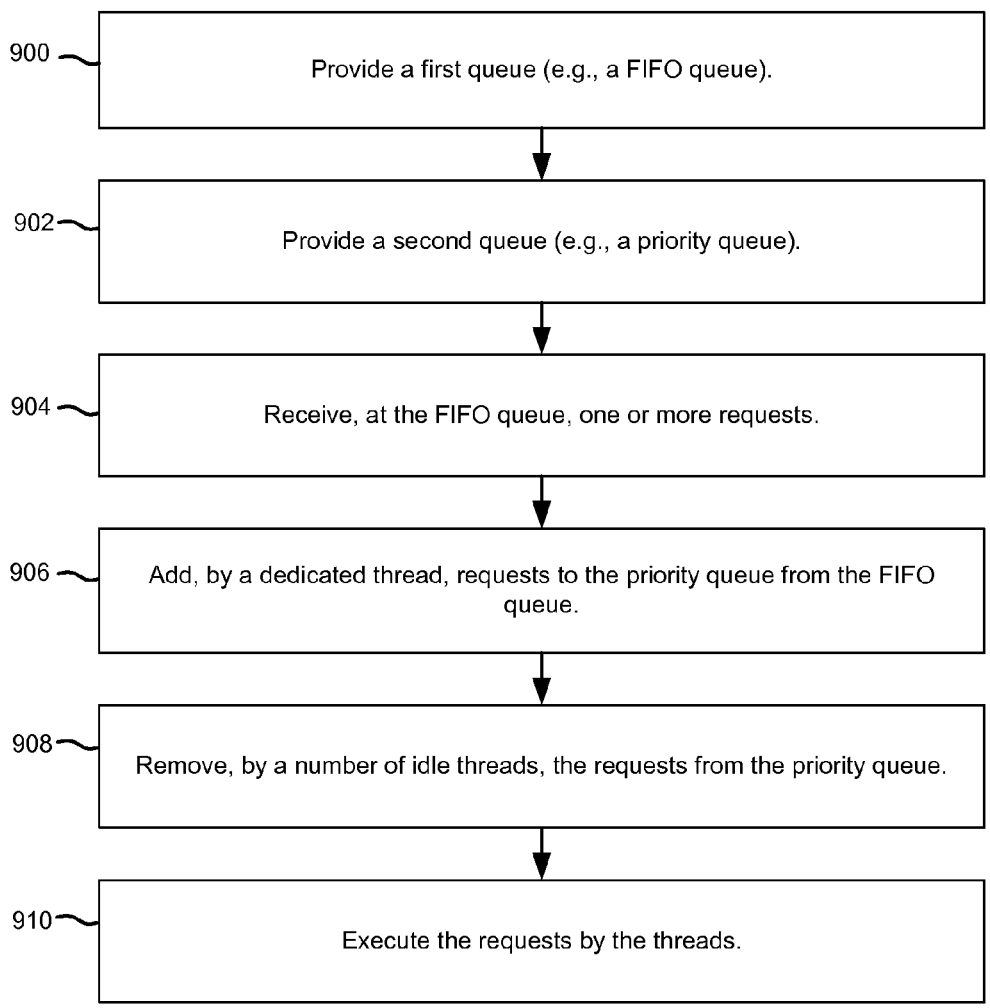
FIG. 9 shows a flowchart of a method in accordance with an embodiment of the invention, for improving concurrency of a priority queue for use in an application server or other environment.

FIG. 9 shows a flowchart of a method in accordance with an embodiment of the invention, for improving concurrency of a priority queue for use in an application server or other environment. At step 900, a first queue is provided, where the first queue can be a first in first out (FIFO) queue. At step 902, a second queue is provided. The second queue can be a priority queue, or any queue that performs some type of work when accepting a request. The priority queue can synchronize the enqueuing and dequeuing of requests. For example, when a request is enqueued, a lock is acquired, and the queue can not be accessed until the lock is released. Similarly, when a request is dequeued, a lock is acquired, and other threads can not access the queue until the lock is released.

At step 904, one or more requests are received by the FIFO queue. At step 906, a dedicated thread empties the FIFO queue by adding requests to the priority queue in the order received at the FIFO queue, and since only the dedicated thread is accessing the priority queue, the lock is contended to a smaller extent. For example, when a request is enqueued in the priority queue, the priority queue is locked, and upon enqueuing the request the lock is released. Thereafter, the dedicated thread can enqueue another request in the priority queue. At step 908, a number of idle worker threads remove requests from the priority or other queues, as explained above in the request sharing section. At step 910 the requests are executed by the worker threads.

3. Concurrent Constraint Enforcement in a Request Manager

Requests received by a request manager can be separated into request types, and each request type can be associated with one or more constraints. In accordance with an embodiment of the invention, instead of claiming the requests, the constraints associated with the requests can be enforced to control how a particular request is processed. For example, by specifying a maximum thread constraint for a particular request type, a request manager or other system component can throttle the execution of requests of that type based on the maximum thread constraint, and thus ensure that those requests do not consume more than a specified number of threads. Thus, requests of a different type can be executed. Similarly, specifying a minimum thread constraint ensures a deadlock resolution. For example, in the case where all threads in a thread pool are executing requests, a particular request can spawn a thread to be used to execute that request.

Figure 10:
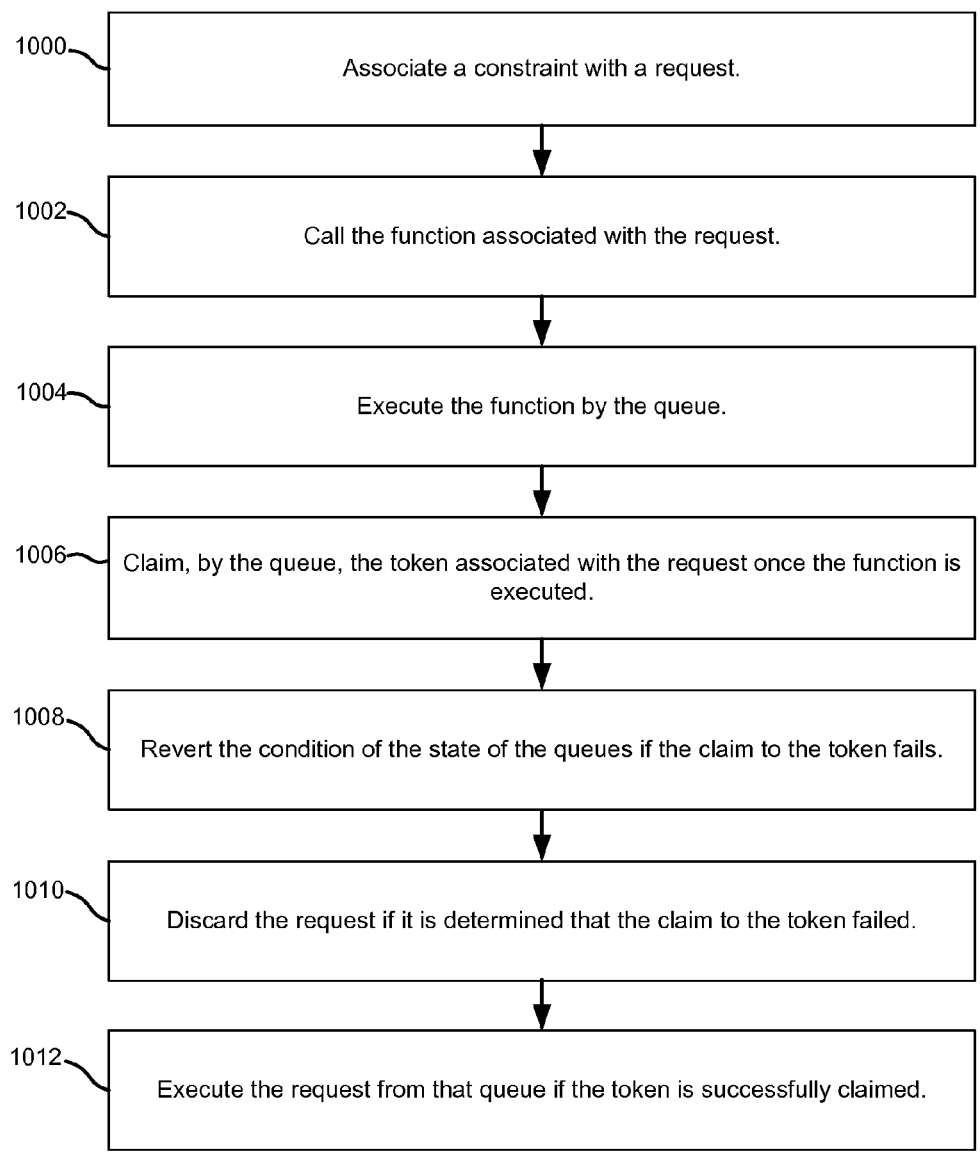
FIG. 10 shows a flowchart of a method in accordance with an embodiment of the invention, for linearizing constraint control and enforcement in a request manager for use in an application server or other environment.

FIG. 10 shows a flowchart of a method in accordance with an embodiment of the invention, for linearizable constraint control and enforcement for use in an application server or other environment. At step 1000, the request manager associates a constraint with a request. As described above, the requests can be shared by multiple queues, and in accordance with an embodiment of the invention, the queue design can be extended to permit the passing of a function (e.g., a flattening function). One type of a function passed to the queue when emptying it is CLAIM_REQUEST, whereby the request's token is modified to claim the request for execution. In another embodiment, when a priority queue is emptied, a CHECK_MAXIMUM_CONSTRAINT function can be passed, which, instead of claiming the request unconditionally, enforces the constraint by checking the maximum constraint, and can claim the request conditionally, if the maximum constraint is not reached. Otherwise, the function moves the request to a different queue (e.g., a maximum constraint FIFO queue) as explained in FIG. 7. In accordance with an embodiment, the queue allows for the use of the same queue to do any of, but not limited to, those operations, depending on the configuration of the multiple queues, constraints associated with individual request types, and the state of the system at the time of the access to the queue.

At step 1002, during the queue's dequeue methods, the function passed to the queue is called. The function can include check maximum constraint, check minimum constraint, and is not limited to these functions. At step 1004, the queue executes the function instead of unconditionally claiming the request in a less sophisticated design. For example, the check maximum constraint function can be passed into a queue and performed during the queue's dequeue method, and the request and the token associated with the request can be moved to another queue. For example, an idle thread checks a priority queue for a request, and passes the check maximum constraint function. The queue invokes the check maximum constraint function to determine whether the request can be claimed successfully. However, the attempt to claim the request succeeds only if the maximum constraint is not reached. If maximum constraint is reached, the check maximum constraint function copies the request and the local copy of the token to a maximum constraint queue, and returns null, to indicate failure to claim the request. The priority queue will attempt to claim another request, or report that the queue is empty.

In accordance with an embodiment of the invention, the check maximum constraint function is satisfied if a number of threads counter is above a maximum constraint threshold, where the number of threads counter indicates a number of threads processing requests of a particular type. If the maximum constraint threshold is satisfied, then requests of this type will not be processed by the priority queue, and instead will be placed in a maximum constraint queue, by copying the reference and the local copy of the token as shown in FIG. 7. Thereafter, upon determining that the request has not been executed concurrently by another thread, the request will be processed by a thread accessing the maximum constraint queue. If the claim was executed concurrently (e.g., executed in another queue), the claim can not be executed a second time, the number of threads counter is reduced, and the request is discarded. Thereafter another request can be processed from the queue.

If the maximum constraint threshold is not satisfied (e.g., there are less requests being processed than the maximum constraint threshold), then the request is processed if the request has not been executed concurrently by another thread. As described above, determining whether a request has been executed concurrently includes comparing and modifying the token associated with the request to a local copy of the token. If the tokens match, the request has not been claimed, and the thread processes the request. If the tokens do not match, the request has been executed concurrently, and the request is discarded. Thereafter, the thread returns to the pool of threads and waits for more requests to arrive.

At step 1006, once the function is executed, the queue attempts to claim the token associated with the request. At step 1008, if the claim to the token fails (e.g., the value of the token associated with the request does not match the value of the local copy of the token), the condition of the constraint counter may need to be reverted since executing the function may temporarily change the state of the constraint counter, yet claiming request may fail afterwards. At step 1010, if it is determined that the claim to the token failed, the request is discarded. Otherwise, at step 1012, if the token is successfully claimed by the thread, the request is executed by that thread from the queue.

It will be evident that the example code provided in Table 2 is provided for purposes of illustration, and that in accordance with other embodiments, other code can be implemented by a queue to implement functions performed or constraints enforced by the queue. In accordance with an embodiment of the invention, claiming the request can be seen as flattening a queue of queues, hence the monadicity and the name of the function.

TABLE 2

```
FlattenMaybe<Request> CLAIM_REQUEST = new
    FlattenMaybe<Request>( )
{
    public Request flatten( Maybe<Request> r, long maybeToken ) {
        return r.claim( maybeToken );
    }
}
FlattenMaybe<Request> CHECK_MAXIMUM_CONSTRAINT =
        new FlattenMaybe<Request>( ) {
    public Request flatten( Maybe<Request> r, long maybeToken ) {
        if ( !acquireMaxConstraint( r ) ) {
            r.maxConstraintQueue.put( r, maybeToken );
            return null;
        }
        Request next = r.claim( maybeToken );
        if ( next == null ) r.maxConstraint.getAndDecrement( );
        else next.minConstraint.getAndIncrement( );
        return next;
    }
```

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for improving concurrency of a request manager for use in an application server, comprising:
   providing a request manager to execute on one or more microprocessors;
   receiving a request by the request manager, wherein the request manager associates a token with the request;
   enqueuing a reference to the request in each of a plurality of queues, wherein each queue stores a local copy of the token;

dequeuing a first reference to the request from a particular queue, wherein when the first reference to the request is dequeued, the request is processed, and the token is modified to create a modified token; and wherein when other references to the request are dequeued from other queues, the other references to the request are discarded.

2. The method of claim 1, further comprising:
providing a priority queue, a maximum constraint queue, and a minimum constraint queue.

3. The method of claim 1, wherein dequeuing the first reference to the request further includes:
comparing the token associated with the request to the local copy of the token, wherein when the token associated with the request matches the local copy of the token, the request is claimed by the particular queue.

4. The method of claim 1, wherein dequeuing the request from other queues further includes:
dequeuing the request by a different queue;
comparing the modified token associated with the request in the different queue to the local copy of the token;
determining, based on the comparison, that the modified token associated with the request does not match the local copy of the token; and
discarding the request from the different queue.

5. The method of claim 1, further comprising:
providing a first in first out (FIFO) queue, wherein the FIFO queue receives a plurality of requests;
providing a priority queue to receive the plurality of requests from the FIFO queue, wherein the priority queue receives requests from the FIFO queue one request at a time;
acquiring a first lock on the priority queue;
enqueuing one of the plurality of request in the priority queue; and
releasing the first lock on the priority queue.

6. The method of claim 5, further comprising:
acquiring a second lock on the priority queue;
dequeuing the one of the plurality of requests from the priority; and
releasing the second lock on the priority queue.

7. The method of claim 5, further comprising:
providing a dedicated thread to enqueue the plurality of requests from the FIFO queue in the priority queue, wherein a number of idle worker threads remove the plurality of requests from the priority queue for processing.

8. The method of claim 1, further comprising:
associating a function with the request, wherein the function, when executed by the queue, causes a change in a state of the queue;
executing the function by the queue when the request is enqueued; and
modifying the state of the queue based on the function.

9. The method of claim 8, further comprising:
attempting to claim the token associated with the request by a worker thread; and
reverting the change of the state of the queue caused by executing the function if the claim to the token fails; otherwise, executing the request by the worker thread.

10. A system for improving concurrency of a request manager, comprising:
one or more microprocessors;
a request manager that executes on said one or more microprocessors, wherein the request manager receives a request, and wherein the request manager associates a token with the request;

a plurality of queues, wherein the request manager enqueues a reference to the request in each of the plurality of queues, and wherein each queue stores a local copy of the token;
a plurality of threads that execute the requests from the plurality of queues, wherein one of the plurality of threads dequeues a first reference to the request from a particular queue, wherein when the first reference to the request is dequeued, the request is processed, and the token is modified to create a modified token; and
wherein when other references to the request are dequeued from other queues, the other references to the request are discarded.

11. The system of claim 10, wherein the plurality of queues is one of a priority queue, a maximum constraint queue, and a minimum constraint queue.

12. The system of claim 10, wherein when the first reference to the request is dequeued, the token associated with the request is compared to the local copy of the token, and wherein when the token associated with the request matches the local copy of the token, the request is claimed by the particular queue.

13. The system of claim 10, wherein when a second reference to the request is dequeued by a different queue, the different queue
compares the modified token associated with the request in the different queue to the local copy of the token;
determines, based on the comparison, that the modified token associated with the request does not match the local copy of the token; and
discards the request from the different queue.

14. The system of claim 10, further comprising:
a first in first out (FIFO) queue, wherein the FIFO queue receives a plurality of requests;
a priority queue to receive the plurality of requests from the FIFO queue, wherein the priority queue receives requests from the FIFO queue one request at a time, and wherein when a dedicated thread attempts to enqueue the request in the priority queue from the FIFO queue, the dedicated thread
acquires a first lock on the priority queue, and
enqueues one of the plurality of request in the priority queue; and
wherein when the request is enqueued, the first lock on the priority queue is released.

15. The system of claim 14, wherein when a worker thread attempts to dequeue the request from the priority queue, the worker thread:
acquires a second lock on the priority queue;
dequeues the one of the plurality of requests from the priority; and
wherein when the one of the plurality of requests request is dequeued, the second lock on the priority queue is released.

16. The system of claim 14, further comprising:
a dedicated thread to enqueue the plurality of requests from the FIFO queue into the priority queue, wherein a number of idle worker threads remove the plurality of requests from the priority queue.

17. The system of claim 10, wherein the request manager further:
associates a function with the request, wherein the function, when executed by the queue, causes a change in a state of the queue; and
enqueues the function with the request, wherein the function is executed by the queue when the request is enqueued, and wherein when the request is executed, a state of the queue is modified based on the function.

18. The system of claim 17, wherein a worker thread attempts to claim the token associated with the request, wherein if the claim to the token fails, the change of the state of the queue reverts back; otherwise, the request is executed by the worker thread.

19. A non-transitory computer readable storage medium storing one or more sequences of instructions for improving concurrency of a request manager for use in an application server, wherein said instructions, when executed by one or more processors, cause the one or more processors to execute steps comprising:
   providing a request manager to execute on one or more microprocessors;
   receiving a request by the request manager, wherein the request manager associates a token with the request;
   enqueuing a reference to the request in each of a plurality of queues, wherein each queue stores a local copy of the token;
   dequeuing a first reference to the request from a particular queue, wherein when the first reference to the request is dequeued, the request is processed, and the token is modified to create a modified token; and
   wherein when other references to the request are dequeued from other queues, the other references to the request are discarded.

20. The non-transitory computer readable storage medium of claim 19, further comprising:
   comparing the token associated with the request to the local copy of the token, wherein when the token associated with the request matches the local copy of the token, the request is claimed by the particular queue.

* * * * *

UNITED STATES PATENT AND TRADEMARK OFFICE
CERTIFICATE OF CORRECTION

PATENT NO.         : 8,930,584 B2
APPLICATION NO.    : 13/570434
DATED              : January 6, 2015
INVENTOR(S)        : Otenko et al.

Page 1 of 1

It is certified that error appears in the above-identified patent and that said Letters Patent is hereby corrected as shown below:

On Title page, column 2, under Other Publications, line 3, delete "UNSENIX" and insert -- USENIX --, therefor.

In the Claims

In column 14, line 53, in Claim 15, delete "requests request" and insert -- requests --, therefor.

Signed and Sealed this
Eighth Day of September, 2015

Michelle K. Lee
*Director of the United States Patent and Trademark Office*